United States Patent [19]
Butin

[11] 4,322,686
[45] Mar. 30, 1982

[54] FREQUENCY COMPARATOR CIRCUIT
[75] Inventor: Henri Butin, Paris, France
[73] Assignee: Thomson-CSF, Paris, France
[21] Appl. No.: 125,279
[22] Filed: Feb. 27, 1980
[30] Foreign Application Priority Data
  Mar. 16, 1979 [FR] France ................................ 79 06742
[51] Int. Cl.³ ...................... H03K 13/32; H03K 5/26; H03L 7/24
[52] U.S. Cl. ..................................... 328/119; 328/134; 307/518; 307/527
[58] Field of Search ........................ 307/518, 526, 527; 328/119, 134

[56] References Cited
U.S. PATENT DOCUMENTS
3,818,358  6/1974  Russell ........................... 328/119 X
3,942,125  3/1976  Horiuchi et al. ............... 328/119 X
4,128,812 12/1978  Paulis ............................. 328/134
4,169,264  9/1979  Parker ........................... 328/119 X
4,220,924  9/1980  Osann ............................. 328/119

Primary Examiner—John S. Heyman

[57] ABSTRACT

The frequency comparator circuit serves to determine whether the signal received contains an expected signal of frequency f and time B. After clipping, the signal received is used as the logic signal A for comparison with two square-wave signals F and $F_q$ in quadrature and of frequency f. Two counters count forwards respectively when $A\overline{F}\overline{F_q}$ U $\overline{A}\overline{F}F_q = 1$ and $A\overline{F}F_q$ U $\overline{A}F\overline{F_q} = 1$ and count backwards when $AFF_q$ u $\overline{A}\overline{F}\overline{F_q} = 1$ and $A\overline{F}\overline{F_q}$ U $\overline{A}FF_q = 1$. The passage of the counters through predetermined counts indicates that the expected signal has been received. In order to reduce errors and obtain a maximum count with the expected signal, a control device incorporating a delay circuit only authorises the operation of the counters when A and A delayed by K/f differ, with K such that $K/f \leq B < K + 1/f$.

3 Claims, 1 Drawing Figure

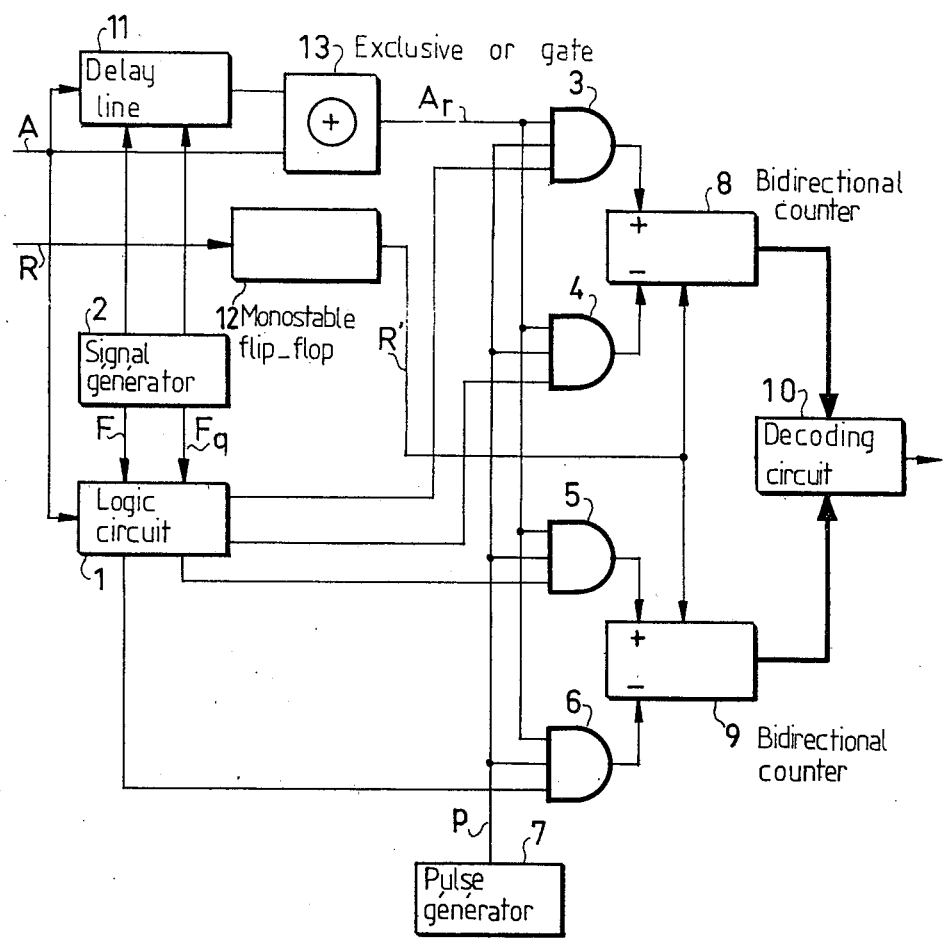

FREQUENCY COMPARATOR CIRCUIT

BACKGROUND OF THE INVENTION

The present invention relates to a frequency comparator circuit of the type incorporating means for the comparison of the signs A, F, $F_q$ of the respective instantaneous amplitudes of a signal received, of a reference signal of period T and a reference signal phase-displaced by T/4, whereby counting means supply a first signal proportional to the difference between the sum of the time slots where A differs from F and $F_q$ and where A is identical to F and $F_q$ and a second signal proportional to the difference between the sums of the time slots where A is different from F and identical to $F_q$ and where A is identical to F and different from $F_q$.

The present invention is directed more particularly at selective calling devices used in radiotelephone communications or used for the selective calling of persons. In these devices, the telephone numbers are transmitted in the form of successive tones, each tone representing for example a digit. If a telephone whose number is composed of three digits, for example 3-9-2, receives a sequence of tones, to know whether the selective call is intended for it the telephone will investigate corresponding to the digit 3 then, if it finds it, the tone corresponding to digit 9, then, if the tone corresponding to the digit 9 immediately follows the tone corresponding to the digit 3, it will investigate the tone corresponding to the digit 2. Thus, the telephone must be able to recognise a predetermined tone, called the expected tone.

It is known to carry out this investigation of expected tones by means of a frequency comparator of the type indicated hereinbefore and in which the counting means perform a count from a given time. This given time is generally determined by a control pulse periodically supplied by a pulse generator belonging to the frequency comparator circuit.

Such frequency comparator circuits function satisfactorily, but do not make it possible to carry out with the said counting means counts which, at a given moment, relate to the duration of the expected tone. For this purpose, it will be necessary for the control pulse to be transmitted at the time of changing the tones, which is not generally possible, particularly when investigating a first tone of a sequence of expected successive tones and can only be due to chance. These frequency comparator circuits do not make it possible to fully take advantage of the fact that in general the duration of the tones received is known. They are consequently more sensitive to noise than in the case where the counts by the counting means could be systematically carried out for the duration of the tone.

BRIEF SUMMARY OF THE INVENTION

The object of the present invention is to reduce this sensitivity to noise. This is made possible by carrying out counts which, at any time, at the most only take account of what has been supplied to the counting means during the preceding time D and by giving to said time D a value which is as close as possible to the duration of the expected tone. This means to say that by using the counting means a floating integration is carried out on a time D.

According to the invention, this object is achieved by a frequency comparator circuit which comprises a signal input for receiving a signal to be investigated, a signal generator for supplying a first reference signal of period T and a second reference signal of period T, phase-displaced by T/4 compared with the first reference signal, comparison means coupled to the signal input and to the signal generator for comparing the signs A, F, $F_q$ of the respective instantaneous amplitudes of the signal to be investigated, the first reference signal and the second reference signal, counting means, having a locking input, coupled to the comparison means for supplying a first counting signal proportional to the difference between the sums of the time slots where A differs from F and $F_q$ and where A is identical to F and $F_q$ and a second counting signal proportional to the difference between the sums of the time slots where A differs from F and is identical to $F_q$ and where A is identical to F and differs from $F_q$, a delay circuit whose delay time is KT (K positive integer) coupled to the signal input and having an output and a locking circuit having two inputs respectively coupled to the signal input and to the output of the delay circuit and an output coupled to the locking input of the counting means for locking the operation of the counting means when the signs of the amplitudes of the signals on said two inputs are identical.

DESCRIPTION OF THE DRAWING AND PREFERRED EMBODIMENTS

The invention is described in greater detail hereinafter with reference to non-limitative embodiments and the attached drawing which shows a frequency comparator circuit according to the invention.

A brief description of the operation of certain prior art frequency comparator circuits will provide a better understanding of the present invention.

In known frequency comparator circuits, the signal received whose frequency must be compared with a frequency f is clipped to form a square-wave signal A. Two square-wave signals F and $F_q$, both at frequency f, but displaced with respect to one another by a quarter of a period are created in the frequency comparator circuit. The signals A, F and $F_q$ are procesed like logic signals and are combined so as to permit the study of the variation in time of quantities:

$$S = |S_1 - S_2|$$

$$D = |D_1 - D_2|$$

the vertical lines signifying "absolute value of" and $S_1$, $S_2$, $D_1$ and $D_2$ respectively represent $$S_1 = d(A \oplus F) + d(A \oplus F_q)$$

$$S_2 = d(\overline{A \oplus F}) + d(\overline{A \oplus F_q})$$

$$D_1 = d(A \oplus F) + d(A \oplus F_q)$$

$$D_2 = d(\overline{A \oplus F}) + d(\overline{A \oplus F_q})$$

the notation d(X) signifying "duration during which the logic expression X equals 1". The right-part of these equations signifies, for example for $D_1$: sum of time slots where at the same time A modulo F is equal to 1 and conversely A modulo $F_1$ is equal to 1, i.e. A modulo $F_q = 0$. Thus, these equations can be written:

$$S_1 = d(\overline{AFF_q} \cup \overline{A}FF_q)$$

which means: $S_1$ is the sum of the time slots where either $\overline{AFF_q} = 1$ or $\overline{A}FF_q = 1$, i.e. where either A and the reciprocal of F and $F_q$ are equal to 1, or the reciprocal of A and F and $F_q$ are equal to 1

$$S_2 = d(AFF_q \cup \overline{AFF_q})$$

$$D_1 = d(A\overline{FF_q} \cup \overline{A}FF_q)$$

$$D_2 = d(AF\overline{F_q} \cup \overline{A}\overline{F}F_q)$$

In these known frequency comparator circuits, two bidirectional counters respectively receive on their forward counting control input the signal
$A\overline{FF_q} \cup \overline{A}FF_q$
$\overline{A}FF_q \cup A\overline{FF_q}$
on their background counting control input the signals
$AFF_q \cup \overline{A}\,\overline{FF_q}$
$\overline{A}FF_q \cup A\overline{F}F_q$
These counters count the pulses at a frequency well above the frequency f and their count is therefore representative of the functions S and D.

If the signal A is at the frequency f or at a frequency which is very close thereto, the two counters perform their counts, which vary more in one direction (forward or backward counting) than in the other. The passage of one counter through a predetermined value is significant of the fact that the frequency of A is equal to or very close to f. It should also be noted that to the extent that signal A is at frequency f, one of the two bidirectional counters performs its count which increases (or decreases) for a period $T=1/f$ by a value equal to a permanent count for the time $T/2$ and this applies no matter what the phase-displacement between signal A and signal F.

If the frequency of signal A is not equal to f (or very close to f) the two bidirectional counters count forwards and backwards during the time slots which, on average, balance out, so that their count does not reach the predetermined value.

In these frequency comparator circuits, the bidirectional counters are reset to zero (or to a given value) by regularly spaced signals which do not necessarily coincide with the transitions between successive tones. At the start of such a transition the content of the counters is not strictly zero (or equal to the given value), which is the cause of inferior performances because the given value must be chosen lower than that which would be strictly necessary without this problem.

In the circuit according to the drawing at a given time the bidirectional counters carry out their count, which corresponds to the forward/backward count performed for the complete duration of a tone or at least for an integer of period $T=1/f$, which is as close as possible to the duration of the expected tone.

The drawing shows a signal A, which is a signal received by a receiver and which has been clipped to be used as a logic signal at two levels 0 and 1. This signal is applied to the first input of a logic circuit 1 which receives, from a signal generator 2, signals F and $F_q$ respectively on its second and third inputs. The signals F and $F_q$ are square-wave signals of frequency f and are displaced relative to one another by a quarter of a period.

The logic circuit, which incorporates inverters, AND gates and OR gates processes the signals:
$A\overline{FF_q} \cup \overline{A}F F_q$
$AFF_q \overline{AFF_q}$
$AF\overline{F_q} \cup \overline{A}\overline{F}F_q$
$AF\overline{F_q} \cup \overline{A}\overline{F}F_q$ These signals are respectively applied to the first inputs of four AND gates 3, 4, 5, 6, which receive at their second input pulses p at a frequency which is well above f and are supplied by a pulse generator 7.

The outputs of the AND gtes 3 and 4 are respectively connected to the forward count input and to the backward count input of a first bidirectional counter 8. The outputs of the AND gates 5 and 6 are respectively connected to the forward count input and to the backward count input of a second bidirectional counter 9.

The bidirectional counters 8 and 9 have an input for resetting to a given value (the value corresponding in this example to their half-capacity M) to which is applied a signal which will be defined hereinafter (signal R').

The multiple outputs of the bidirectional counters 8 and 9 are connected to the inputs of a decoding circuit 10 which supplies an output signal when one of the bidirectional counters passes through a given value.

The part of the diagram described hereinbefore and which incorporates elements 1 to 10 corresponds to the diagram of a prior art frequency comparator circuit. In a circuit operation according to the prior art and having only the components 1 to 10, the signal R' applied to the bidirectional counters 8 and 9 is generally a signal formed from regularly spaced pulses.

The frequency comparator circuit according to the drawing has, in addition to the elements 1 to 10, a binary delay line 11 and an EXCLUSIVE OR gate 13. The delay line 11 is in the present example a shift register.

Signal A is applied to the signal input of delay line 11, which respectively receives at its two timing inputs a timing input signal $h_1$ and a timing input signal $h_2$, said signals $h_1$ and $h_2$ being processed by the signal generator. The delay line 11 supplies an output signal $A_r$.

The EXCLUSIVE OR gate 13 receives signals A and $A_r$ and its output is connected to the third inputs of AND gates 3, 4, 5, 6.

An initiation signal R constituted by a pulse is produced during the starting up of the frequency comparator circuit according to the drawing. It is applied to a monostable flip-flop 12 having a duration slightly longer than that of one tone. During its quasi-stable state, the monostable flip-flop supplies an output signal R', which maintains the bidirectional counters 8, 9 at a predetermined initial count M. B is the known duration of an expected tone of frequency $f=1/T$. The elements 11, 13 described hereinbefore function as follows.

The delay line 11 operates under the action of signals $h_1$ and $h_2$ selected so as to have a frequency equal to $N/KT$ in which N is the pitch number of the delay line and K an integer. It is generally advantageous to select K so that KT is close to B. In the described example K satisfies the double inequation $$KT \leq B < (K+1)T$$

Thus, the value of the delay provided by the delay line, the integer of the periods T included in the time B of the expected tone.

Signals $h_1$ and $h_2$ are square-wave signals displaced with respect to one another by a half-period. The delay line supply signal $A_r$, which is identical to signal A, but is delayed by duration KT. The EXCLUSIVE OR gate 13 blocks the AND gates 3, 4, 5, 6 when the signal $A_r$, received at one of its inputs is equal to the signal A, which it receives at its other input. Thus, the EXCLU- SIVE OR gate 13 only authorises the forward or backward counting of pulses p when $A_r$ differs from A.

At time t (with a zero point of the times taken at incident KT after transmitting the signal R') the signals F and $F_q$ have the same value as at time t-KT it being understood that they are frequency $f = 1/T$. Thus, if $A_r$ differs from A (i.e. if A at time t-KT differs from A at time t) and if for example the bidirectional counter 8 counted forwards at time t-KT ($A\overline{F}\overline{F_q} \cup \overline{A}FF_q = 1$), it would count backwards at time t (because then the relationship $AFF_q \cup \overline{A}\overline{F}\overline{F_q}$ would be checked). In the same way with $A_r$ different from A, the bidirectional counter 8 would count forwards at time t if it counted backwards at time t-KT and the bidirectional counter 9 would count forwards or backwards at time t, depending on whether it counted forwards or backwards at time t-KT.

In conclusion, the bidirectional counters 8 and 9 have at any time t, counts which are representative respectively of the functions S and D (as defined hereinbefore) between the times t-KT and t, i.e. counts representative of the integration between t-KT and t of durations $$S = |[d(A \oplus F) + d(A \oplus F_q)] - [d(\overline{A} \oplus F) + d(\overline{A} \oplus F_q)]|$$

$$D = |[d(A \oplus F) + d(\overline{A} \oplus F_q)] - [d(\overline{A} \oplus F) + d(A \oplus F_q)]|$$

In these equations, the sign + has the meaning of the logic AND function, whilst the sign — has the meaning of the arithmetic minus.

Thus, when during the period KT, the signal received A would have had the frequency f, the count of one of the bidirectional counters 8, 9 would reach by forward and/or backward counts one of the two values, whose difference with the value of its initial count M would be equal to KT'/2, to with any possible interference pulses (T' being the number of pulses p supplied by generator 7 during time T). This results from what has been stated hereinbefore, namely that no matter what the phase displacement between A and F, one of the two bidirectional counters performs its count, which varies from T'/2 during a period T if A is at frequency f.

The decoding circuit 10 is such that it gives an output signal when one or other of the bidirectional counters 8, 9 passes through one of the values $M \pm |KT'/2 - E|$ in which E is a small number of pulses before KT'/2 to take account of possible interference pulses.

The description given hereinbefore relates to a frequency comparator circuit of a selective call device with 11 different tones, whose respective frequencies are as defined in the C C I R standards for selective calls. The duration B is 100 mS.

In the presently described frequency comparator circuit delay line 11 is a shift register with 1024 bits, manufactured by the INTERSIL company under reference IM 7722.

In addition to the circuits described hereinbefore the frequency comparator circuit incorporates control circuits making it possible to change the frequencies of the signal supplied by signal generator 2 and pulse generator 7 as a function of the expected tone and its duration, when the latter is not the same for all the tones. These control circuits are not necessary for the understanding of the invention, so that they are not shown in the drawing.

What is claimed is:

1. A frequency comparator circuit which comprises a signal input for receiving a signal to be investigated, a signal generator for supplying a first reference signal of period T and a second reference signal of period T, phase-displayed by T/4 compared with the first reference signal, comparison means coupled to the signal input and to the signal generator for comparing the signs A, F, $F_q$ of the respective instantaneous amplitudes of the signal to be investigated, the first reference signal and the second reference signal, counting means, having a locking input, coupled to the comparison means for supplying a first counting signal proportional to the difference between the sums of the time slots where A differs from F and $F_q$ and where A is identical to F and $F_q$ and a second counting signal proportional to the difference between the sums of the time slots where A differs from F and is identical to $F_q$ and where A is identical to F and differs from $F_q$, a delay circuit whose delay time is KT (K positive integer) coupled to the signal input and having an output and a locking circuit having two inputs respectively coupled to the signal input and to the output of the delay circuit and an output coupled to the locking output of the counting means for locking the operation of the counting means when the signs of the amplitudes of the signals on said two inputs are identical.

2. A frequency comparator circuit according to claim 1, for recognising in the signal to be investigated a signal of period equal to T and whose time B is known and is higher than T, for which K checks the double inequation $$KT \leq B \leq (K+1)T.$$

3. A frequency comparator according to claim 1, whose delay circuit incorporates a delay line of the shift register type having a number N of pictures and whose timing signal frequency is $h = N/KT$.

* * * * *